Patented Nov. 6, 1934

1,979,495

UNITED STATES PATENT OFFICE 1,979,495

PROCESS FOR THE MANUFACTURE OF VARNISHES AND THE LIKE

Johannes Scheiber, Leipzig, Germany

No Drawing. Application February 7, 1929, Serial No. 338,319. In Germany July 30, 1928

4 Claims. (Cl. 134—26)

I have found that by conversion of ricinoleic acid into octadekadienic-(9,11)-acid a by-product is formed which proved specially suitable as a raw material for the manufacture of varnishes and the like. If the ricinoleic acid is distilled in vacuo, a solid gumlike residue is finally obtained which amounts to 10% of the quantity of ricinoleic acid originally used. That residue is insoluble in the usual solvents, but by fusing with rosin, for instance, is converted into a mass soluble in benzene and so forth and is distinguished as a good film-former.

However, it is even more preferable to break off the distillation of the ricinoleic acid at an earlier period, when the residue of the distillation is still liquid and soluble, so that it can be utilized in a like manner without the cooperation of rosin. The right time to interrupt the distillation is, when about 70 to 80% have been driven off in the form of octadekadienic-(9,11)-acid. The residue obtained under those conditions exhibits a light yellow or light brownish colour and a consistency like glycerol. The acid figure is about 40 to 50, and by heating with glycerol or another alcohol it can be lowered to about nought. If the material be applied in the natural or esterified state in a thin layer, it will form after a few hours and without a siccative a glossy, adhesive and colourless film which while retaining its elasticity and toughness quickly loses its stickiness.

The product can be utilized either by itself in the original or esterified state or in combination with other varnish-components. For instance, it can be worked up along with fatty oils in a raw or treated state, with blown or kettle bodied oils etc. One is not limited to the use of drying fatty oils only. Furthermore, the product can be worked in combination with natural or artificial resins, whereby the elastifying properties of the lacquer will prominently come out. The same is the case if the product of distillation is worked up along with bituminous products of natural or artificial source. It is not difficult to utilize the residual product in combination with any mixtures of the ingredients just mentioned.

A specially useful application for the new material is as an addition to the half synthetic products of the nature of fatty oils, which can be obtained by the esterification of octadekadienic-(9,11)-acid with glycerol, etc. If after the cracking of the ricinoleic acid by distillation the distillate and the residue be united for a joint esterification with glycerol, products of the nature of thickened wood-oil with all its excellent properties are obtained. It is possible to esterify the acid alone and to add the residual product subsequently, even after previous esterification. As a matter of course, the products obtained in one way or other can be combined with other ingredients, for instance fatty oils of any preparation, natural or artificial resins, bituminous products and the like.

It may also be noted that the residue of the distillation can be worked together with cellulose esters, wherein it plays the part of the agent which increases the adhesion and augments the brilliancy and elasticity. Finally the product can also form the agent for effecting the solution of any fatty oils added.

All the products obtained can not only be used as transparent or transparent coloured varnishes or lacquers, but also as binders for paints of any kind as well as for porefillers or other filling materials.

For the purposes of the present invention the meaning of the term "ricinoleic acid" is the technical mixture of the fatty acids obtained from castor-oil. The ricinelaidinic acid is here an equivalent since it also yields by distillation octadekadienic-(9,11)-acid and the residue of distillation shows the same character and properties as the residue from distilling ricinoleic acid.

For the esterification of the residue of distillation I can employ besides glycerol any other alcohol. Since the capacity of drying does not depend upon the combination with a polyhydric alcohol, I may also use an univalent alcohol and of course glycol or higher alcohols.

What I claim is:—

1. The step of the herein described method which consists in distilling castor-oil acid in vacuo until the residue is 30 to 20 per cent of the original weight of the castor oil acid and then heating such residue of still liquid and soluble character with an aliphatic polyhydric alcohol.

2. The step of the herein described method which consists in distilling castor-oil acid in vacuo until the residue is 30 to 20 per cent of the original weight of the castor oil acid, and then heating such residue of still liquid and soluble character together with octadekadienic-9,11-acid-1 and glycerol.

3. The material produced by the method defined in claim 1.

4. The material produced by the method defined in claim 2.

JOHANNES SCHEIBER.